J. T. FLAHERTY.
METHOD FOR CONSERVATION IN THE WEAR OF RUBBER VEHICLE WHEEL TIRES.
APPLICATION FILED DEC. 1, 1914.
1,182,669.
Patented May 9, 1916.
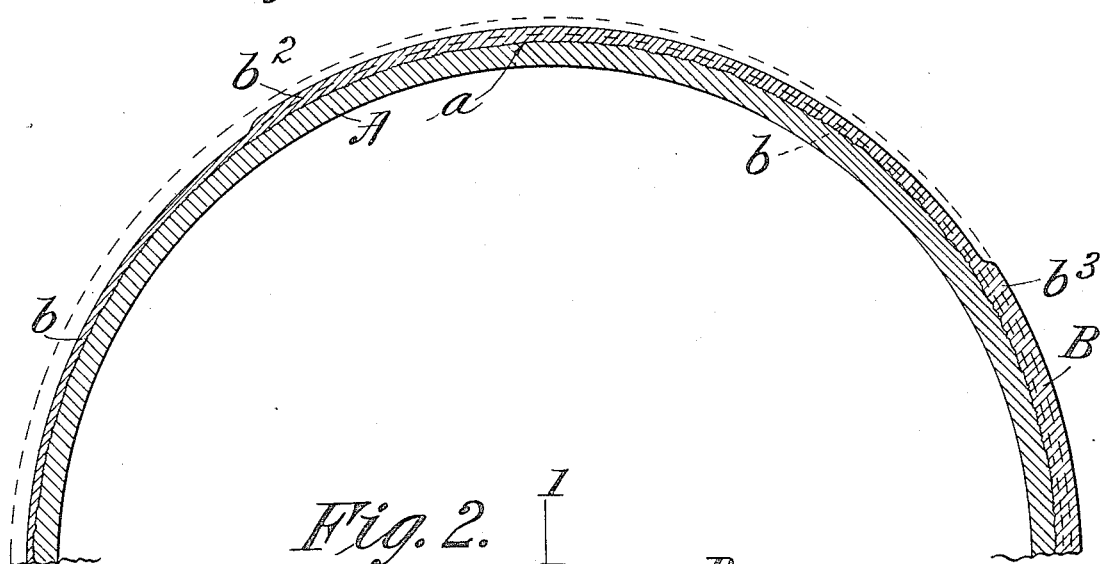
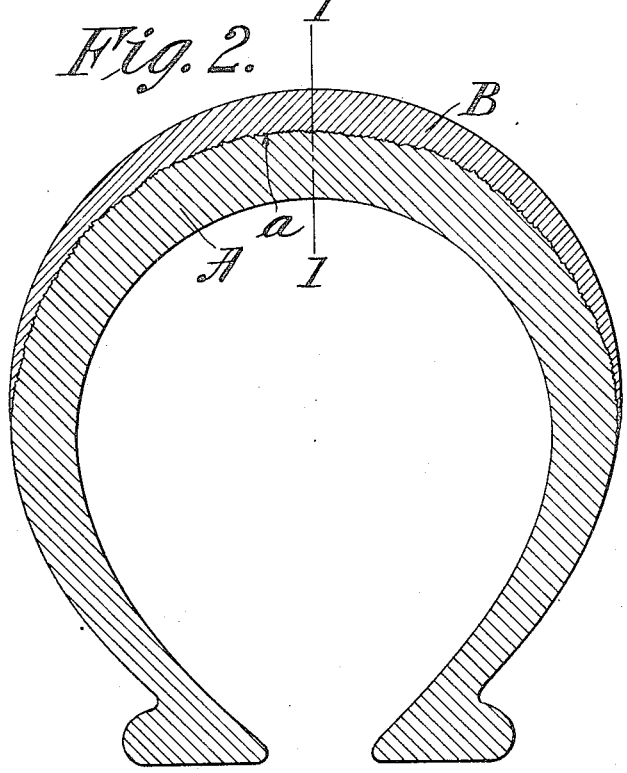
WITNESSES:
INVENTOR,
John T. Flaherty,
BY
ATTORNEY.

UNITED STATES PATENT OFFICE.

JOHN T. FLAHERTY, OF SPRINGFIELD, MASSACHUSETTS.

METHOD FOR CONSERVATION IN THE WEAR OF RUBBER VEHICLE-WHEEL TIRES.

1,182,669.      Specification of Letters Patent.      Patented May 9, 1916.

Application filed December 1, 1914. Serial No. 875,005.

*To all whom it may concern:*

Be it known that I, JOHN T. FLAHERTY, a citizen of the United States of America, and resident of Springfield, in the county of Hampden and State of Massachusetts, have invented certain new and useful Improvements in Methods for Conservation in the Wear of Rubber Vehicle-Wheel Tires, of which the following is a full, clear, and exact description.

This invention relates to an improved rubber tire for vehicle wheels and especially to a method of production thereof whereby the wearing life of the tire will be materially increased and the durability or wearing capability of the tire greatly conserved.

In carrying out the invention, I produce a compound of semi-liquid consistency as follows: Rubber buffings, that is comminuted or granulated particles of rubber derived from the finishings of tires as generally manufactured and produced are mixed with pure para cement (that is a thin liquid of rubber and benzin) in about equal proportions, or, if varied, rather more of the para cement than the rubber buffings. This mixture is allowed to set in a dry place for from 8 to 10 hours, whereupon the rubber buffings soluble in the liquid cement, having then a semi-liquid consistency, is ready for use.

The surface of the tire to receive the covering is, when the necessity exists therefor, cleaned, as by the use of gasolene or other detergent applicable for the purpose.

The compound produced as above stated is preferably applied by a stiff bristle brush entirely around the tread surface of the tire to form a covering of substantial thickness, adherent and forming a homogeneous supplement to the thickness of the tire; and before the so covered tire is to be used on the road, it is left to dry and harden a period of from 8 to 10 hours being sufficient therefor.

The preferred manner of applying the covering on and to augment the wearing capabilities of the tire is to first apply a light coating as that of a coat of paint; and starting at one point in the circumferential length of the tire the coating is applied on and around the tire until the place of starting has been reached. The portion of the tire on which the covering was first applied soon becoming more or less dry and set or partially hardened, the person performing the work will then proceed over and around the tire with one or several successive coatings or layers, preferably thicker than the first applied layer, until the accretion of the several layers provide a covering of such substantial thickness as to form a homogeneous and wear resisting supplement to that of the tire proper.

The compound applied as above described, left for 8 hours or indefinitely longer in a room of ordinary temperature is found to form an elastic or cushion-like tread covering which will check the wear of the tire for its use for many hundreds, and even thousands, of miles before worn away and down to the surface of the original tire; although from time to time before such extent of wearing shall have transpired further application in the manner described may be made.

In cases where the tires to receive the treatment under my process may by wear have become very smooth and glassy on the tread surface, such surface may be roughened in any practicable manner as by the employment of an emery wheel or otherwise, this roughening adapting the tire to receive in a manner to become practically homogeneous therewith, the compound as above stated and to be employed thereon.

I am aware that layers of vulcanized rubber have been applied and secured by vulcanization on, and as an outer protective covering for the tread portion of a tire, but this invention does not contemplate anything of that character. I am also aware that compounds in the nature of a liquid cement have been injected into holes or cuts or punctures in tires for the purpose of closing same, but such is not the object of my invention which is rather to so condition the tire that liability of cuts and punctures will be greatly lessened.

One quart of the described compound will be found ample for the covering of the tread portions of four automobile tires of $3\frac{1}{2}$—33 size, in such manner as to give an average increased life to those tires of approximately two thousand miles. Of course, for larger and heavier tires, a proportionately increased quantity of the compound will be necessary for a corresponding augmentation of the wearing life of such tires.

In the drawings:—Figure 1 represents a sectional view of a half of the circumferential length of the outer wall of an automobile tire case or shoe, indicating the progressively applied layers of the tire covering material thereon,—Fig. 2 being a cross sectional view of the shoe. Section line 1—1 on Fig. 2 indicates the plane on which the section Fig. 2 is taken.

In these drawings, A represents the tire proper; *a* represents the roughened surface of the tread portion thereof.

B represents the elastic tire covering provided by the compound applied on the tread portion of the tire as above described.

*b* indicates in part by full, and in part by dotted lines, the first layer of the covering understood as applied around the tire.

$b^2$ indicates a further layer, and $b^3$ a third layer, the so built-up covering of the thickness shown by the combined first, second and third layers being the same continuously around the tread portion of the tire; but toward the flanks, as represented in Fig. 2, lessened thickness of the covering is necessary.

The applying of the described layer of tread surface covering material around on the tire may be done by any unskilled person, and it is especially to be made known that no vulcanization by the use of heat is required in the process.

I claim:

1. The method of conserving the durability of a rubber vehicle wheel tire which consists in applying on and entirely around the tread surface of the tire a semi-liquid compound of rubber, to form a covering of substantial thickness, adherent to and forming a homogeneous supplement to the thickness of the tire, and before use of the so covered tire leaving it to dry and harden.

2. The method of conserving the durability of a rubber tire which consists in applying on and entirely around the tread surface of the tire a covering layer of a semi-liquid compound of rubber, and leaving same to partially dry and harden, then applying further covering layers of said compound on the preceding partially dried and hardened layers whereby the accretions thereof provide a covering of substantial thickness adherent to and forming a homogeneous supplement to the thickness of the tire proper, and before use of the so covered tire leaving it to dry and harden.

3. The method of conserving the durability of a rubber vehicle wheel tire, which consists in roughening the tread surface of the tire, applying on and entirely around the roughened tread surface of the tire a semi-liquid compound of rubber to form a covering of substantial thickness, adherent to and forming a homogeneous supplement to the thickness of the tire, and before use of the so covered tire leaving it to dry and harden.

Signed by me at Springfield, Mass., in presence of two subscribing witnesses.

JOHN T. FLAHERTY.

Witnesses:
 WM. S. BELLOWS,
 G. R. DRISCOLL.